(12) United States Patent
Chen et al.

(10) Patent No.: US 8,532,664 B2
(45) Date of Patent: Sep. 10, 2013

(54) METHOD AND APPARATUS TO IMPROVE CDMA REVERSE LINK PERFORMANCE

(75) Inventors: Wanshi Chen, San Diego, CA (US); Reza Shahidi, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2667 days.

(21) Appl. No.: 10/676,965

(22) Filed: Oct. 1, 2003

(65) Prior Publication Data

US 2005/0073975 A1    Apr. 7, 2005

(51) Int. Cl.
*H04W 36/00* (2009.01)

(52) U.S. Cl.
USPC .......................................... 455/442; 455/436

(58) Field of Classification Search
USPC ................ 455/442, 436, 446, 561, 412.1
See application file for complete search history.

(56) References Cited

U.S. PATENT DOCUMENTS

| | | | | |
|---|---|---|---|---|
| 5,625,876 | A * | 4/1997 | Gilhousen et al. | 370/331 |
| 5,999,522 | A * | 12/1999 | Rohani | 370/331 |
| 6,011,787 | A * | 1/2000 | Nakano et al. | 370/335 |
| 6,320,898 | B1 * | 11/2001 | Newson et al. | 375/144 |
| 6,411,799 | B1 * | 6/2002 | Padovani | 455/69 |
| 7,042,858 | B1 | 5/2006 | Ma et al. | |
| 2002/0037726 | A1 * | 3/2002 | Czaja et al. | 455/442 |
| 2002/0154610 | A1 * | 10/2002 | Tiedemann et al. | 370/329 |
| 2003/0050084 | A1 * | 3/2003 | Damnjanovic et al. | 455/522 |
| 2003/0072294 | A1 * | 4/2003 | Wei et al. | 370/345 |
| 2003/0133415 | A1 * | 7/2003 | Kim et al. | 370/235 |
| 2004/0203991 | A1 * | 10/2004 | Chen et al. | 455/522 |
| 2005/0004970 | A1 * | 1/2005 | Jain et al. | 709/200 |
| 2005/0070287 | A1 * | 3/2005 | Cave et al. | 455/436 |

FOREIGN PATENT DOCUMENTS

| WO | WO 02/093969 | 11/2002 |
|---|---|---|
| WO | WO 03/067783 | 8/2003 |

* cited by examiner

*Primary Examiner* — Kwasi Karikari
(74) *Attorney, Agent, or Firm* — Coats & Bennett, P.L.L.C.

(57) ABSTRACT

Reverse link reception and reverse link capacity are improved at a multi-sector radio base station (RBS) by forcing always-softer reverse link handoff conditions for mobile stations served by the RBS. Whenever a serving sector reverse link is assigned to a mobile station at the RBS, one or more additional reverse links are assigned to it from remaining sectors of the RBS. Such assignments are made irrespective of whether those sectors are, or could be, used to serve the mobile station on the forward link. The RBS improves its reception of the mobile station's reverse link transmissions by combining signals from all of the assigned reverse links. With improved reception, mobile stations can be commanded or configured to reduce their reverse link transmit power, thereby reducing reverse link interference and increasing reverse link capacity. Always-softer handoff may not be forced unless the mobile station has a reverse supplemental channel, since the use of such channels makes interference reduction particularly beneficial.

22 Claims, 2 Drawing Sheets

METHOD AND APPARATUS TO IMPROVE CDMA REVERSE LINK PERFORMANCE

BACKGROUND OF THE INVENTION

The present invention generally relates to wireless communication networks and particularly relates to improving reverse link performance in CDMA networks.

CDMA networks generally serve individual mobile stations using the "best" Radio Base Stations (RBSs) for each particular mobile station. Best in this context means the one or more RBSs that provide the mobile station with the strongest radio signal. For example, each mobile station can report signal strengths for RBSs in or around its current location back to the network. With that information, the network sends forward link data to the mobile station using the RBS or RBSs that provide the mobile station with the strongest signals.

Obviously, with mobile station movement and changing reception conditions, no one RBS remains best for any given mobile station. Indeed, the network changes the RBSs selected for serving a given mobile station as needed, and the process of changing service from one RBS to the next is referred to as "soft handoff." The term "soft" implies a make-before-break approach to handing off service from one RBS to the next and simply means that the next (target) RBS begins transmitting to the mobile station before the first (source) RBS stops transmitting to the mobile station.

Handoff of a mobile station also can occur not between distinct RBSs—i.e., not between separate cell sites—but rather between "radio sectors" of the same RBS. This type of handoff is referred to as "softer handoff." Thus, the supporting network manages soft and softer handoffs as needed for mobile stations moving through the service areas of different base stations, and through the service sectors of particular base stations.

Similar operations apply to the reverse link—mobile-station-to-network—as well. That is, the network assigns reverse link radio resources based on the forward link radio resource assignments. Each RBS sector designated as a serving sector on the forward link generally also serves as a receiving sector on the reverse link. Generally, then, conventional CDMA networks select forward link serving sectors based on forward link signal strengths as reported by the mobile stations and reverse link radio resources are then allocated in those serving sectors. The serving sectors may be neighboring sectors at the same RBS (softer handoff), or sectors from different RBSs (soft handoff), or a mix of both (soft and softer handoff).

Of course, most CDMA networks provide for additional types of handoff to handle certain mobility events. For example, a mobile station being handed off from one type of network to another might be forced to undergo a "hard" handoff, requiring a break-before-make termination of service in the first (source) network before beginning service in the next (target) network. Such handoff includes a brief interruption in service and is less reliable than soft/softer handoff. Hard handoff also is used where the mobile station is being handed off from a carrier of one frequency to a carrier of another frequency. Thus, hard handoff might be used even where the mobile station remains in the same service network.

SUMMARY OF THE INVENTION

The present invention comprises a method and apparatus to improve reverse link performance in a CDMA network. Broadly, the present invention comprises making use of softer handoff capabilities normally present in CDMA-based wireless communication networks to improve the reception of reverse link transmissions from mobile stations. With the present invention, whenever a reverse link assignment is made for a mobile station at one sector of a multi-sectored Radio Base Station (RBS), reverse link assignments for the mobile station are made at one or more remaining sectors of the RBS. With this forced assignment of multiple (two or more) reverse links at the RBS irrespective of whether the mobile station is in softer handoff on the forward link, reception of mobile station transmissions generally is improved.

Therefore, an exemplary method of improving reverse link communications at a RBS providing a plurality of radio sectors comprises forcing always-softer reverse link handoff conditions at the RBS for mobile stations served by the RBS based on assigning one or more additional reverse links from remaining sectors of the RBS whenever a reverse link is assigned to a mobile station from a serving sector of the RBS.

Further, the reverse link signals from all of the assigned reverse links are combined to obtain a combined reverse link signal for the mobile station. The combined signal can be generated based on performing a maximum ratio combining of the reverse link signals from all of the assigned reverse links. The combined signal is sent from the RBS to a Base Station Controller for processing.

Complementing the above exemplary method, an exemplary RBS comprises a handoff control circuit configured to implement always-softer reverse link handoff at the RBS by assigning one or more additional reverse links from remaining sectors of the RBS whenever a reverse link is assigned to a mobile station from a serving sector of the RBS, and a combining circuit to combine reverse link signals from the assigned reverse links to obtain a combined reverse link signal for the mobile station. Such circuits can be implemented in hardware, in software, or in some combination of both.

An exemplary RBS can be configured to use an increased RAKE finger search window for receiving signals from the mobile station in the always-softer reverse link handoff condition. Such a configuration can be implemented specifically for the always-softer condition or can be generally used by the RBS. Regardless, the use of an increased search window accommodates the potentially greater reverse link signal delay spreads that are possible when using reverse links in multiple sectors that are associated with sectorized receiving antennas.

If desired, forcing the always-softer reverse link handoff condition can be limited to those mobile stations that use Reverse Supplemental Channels (R-SCHs). Since R-SCHs typically are transmitted at higher power owing to their relatively higher data rates, thus the improved reverse link reception gained through forcing the always-softer reverse link handoff condition can be particularly beneficial in reducing the aggregate reverse link power from mobile stations transmitting on R-SCHs. Note that in an exemplary embodiment, each mobile station's reverse fundamental channel (R-FCH) is controlled in always-softer handoff along with any R-SCHs.

Note, too, that the reverse link assignments made in accordance with the present invention are independent of making forward link assignments. Thus, implementation of the present invention does not disturb the existing forward link assignment operations performed in a given wireless communication network. On this point, then, an exemplary embodiment of the present invention can be made in a CDMA-based wireless network with very little impact on the existing handoff operations, and without any impact on forward link handoff.

Of course, the present invention is not limited by the above descriptions of its broad embodiments. Those skilled in the art will recognize opportunities for varying the present invention and further features and advantages of it upon reading the following detailed description of the invention and upon viewing the accompanying figures.

DETAILED DESCRIPTION OF THE INVENTION

Figure 1:
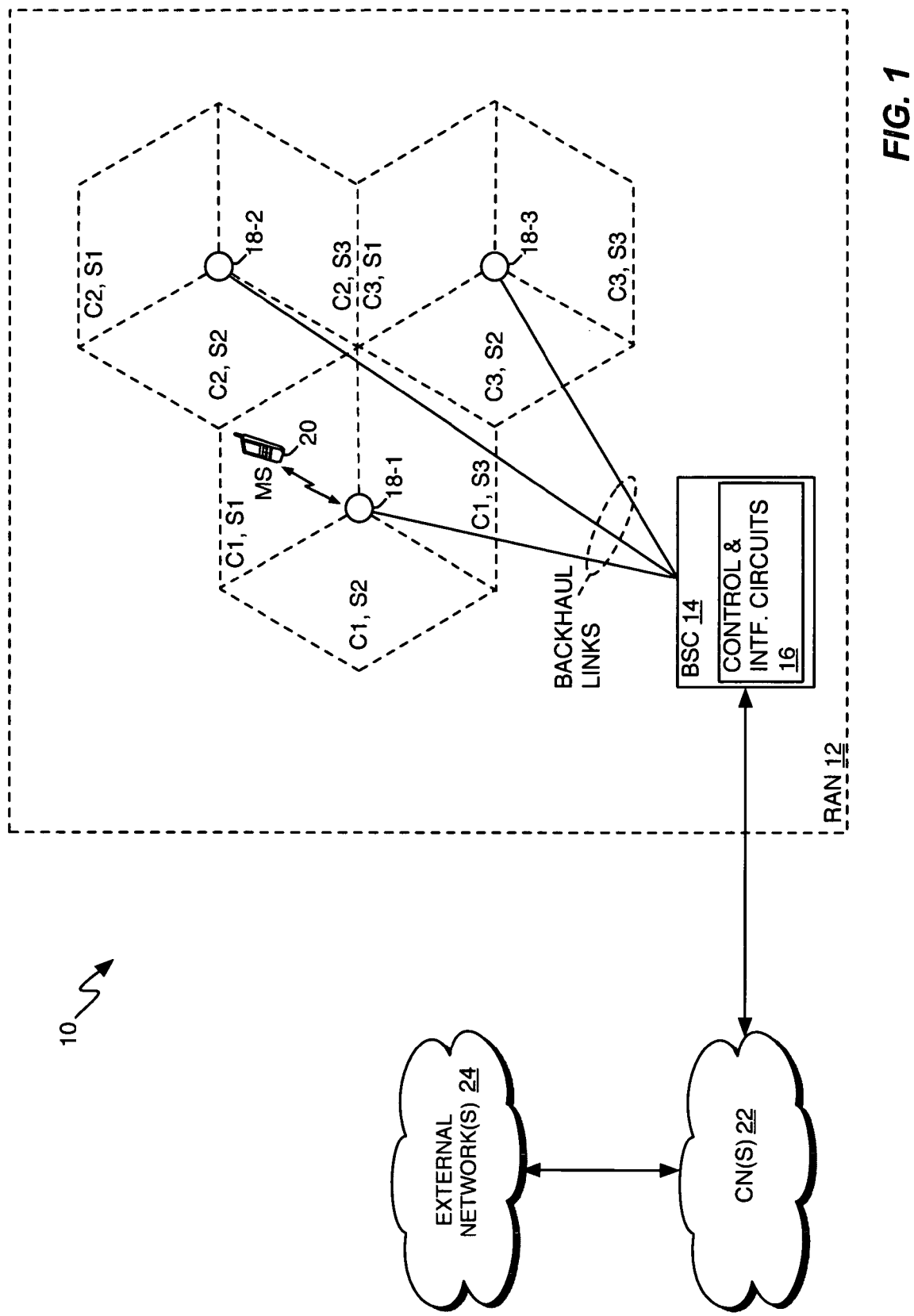
FIG. 1 is a diagram of an exemplary wireless communication network according to the present invention.

FIG. 1 illustrates an exemplary CDMA-based wireless communication network 10 configured according to the present invention. Network 10 comprises a Radio Access Network (RAN) 12 that includes a Base Station Controller (BSC) 14, including control and interface circuits 16, and a plurality of multi-sector Radio Base Stations (RBSs) 18-1, 18-2, and 18-3. It should be understood that in practice, RAN 12 can include a plurality of BSCs 14, each having a greater or lesser number of associated RBS 18.

Regardless, each RBS 18-x provides radio coverage over a plurality of sectors, wherein "x" is a generic reference to any one of the depicted RBSs 18-1, 18-2, and 18-3. Thus, RBSs 18 communicatively couple mobile stations 20 to BSC 14 by providing the air link interface that supports wireless signaling to and from the mobile stations 20. In turn, BSC 14 is linked to one or more Core Networks (CNs) 22 that provide communication links to one or more external networks 24, such as the Internet, the Public Switched Telephone Network, etc.

In the illustration, RBS 18-1 provides radio coverage in Cell 1 on a sectorized basis such that Cell 1 includes three radio sectors designated as (C1, S1), (C1, S2), and (C1, S3). A similar sectorized arrangement is shown for Cells 2 and 3 served by RBSs 18-2 and 18-3, respectively. Note that RBSs 18 can be implemented such that each one offers service on two or more carrier frequencies and that the radio coverage of each depicted cell-and-sector effectively is duplicated for each available carrier.

For example, Cell 1 would offer radio service in Sectors 1, 2, and 3 on a first carrier frequency, and would offer separate and distinct radio service in each of those sectors for a second carrier frequency. Such arrangements are well known in the art and further general details of multi-carrier/multi-sector radio cell implementations are not necessary to understanding the present invention.

In the illustration, the depicted mobile station 20 resides in Sector 1 of Cell 1. In reality, mobile station 20 likely is able to receive signals on the forward link from other sectors of Cell 1 and, indeed, from other sectors of RBSs 18-2 and 18-3. Mobile station 20 may be configured to provide signal strength reports, e.g., Pilot Strength Measurement Messages (PSMMs) to BSC 14 that can be used by it to identify the best (forward link) serving sector for the mobile station 20.

Obviously, as mobile station 20 moves around, the best serving sector changes and, on the forward link, BSC 14 manages the handoff of mobile station 20 from one sector to the next as is understood by those skilled in the art. In keeping with conventionally understood network operations, BSC 14 can be configured to assign a reverse link to the mobile station 20 in each of the designated serving sectors, and to update those reverse link assignments as the serving sector(s) are changed. Thus, as mobile station 20 moves around, or as signal fading conditions change, BSC 14 updates the forward/reverse link serving sector(s) as needed.

However, unlike conventional network operations, each RBS 18-x can be configured to make "extra" or additional reverse link assignments for the mobile station 20 whenever RBS 18-x serves mobile station 20. That is, according to an exemplary embodiment of the present invention, RBSs 18 are configured to "force" an always-softer reverse link handoff condition to improve reverse link performance.

Figure 2:
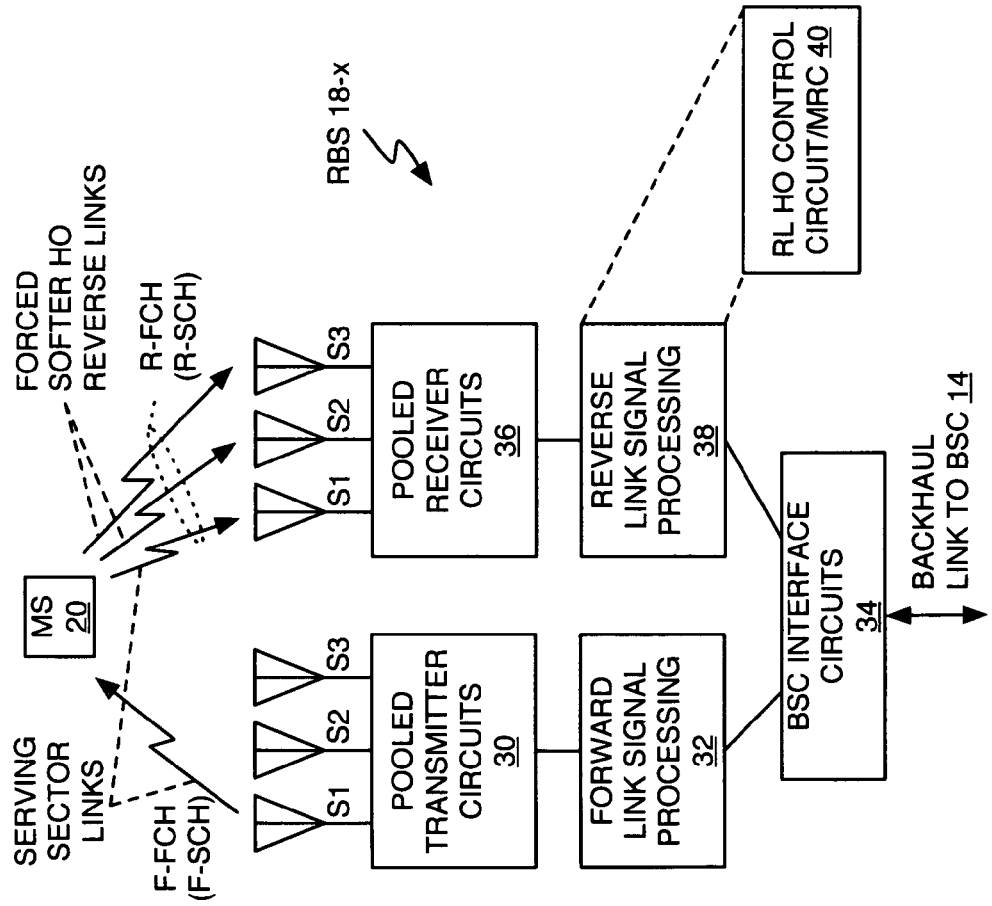
FIG. 2 is a diagram of an exemplary Radio Base Station (RBS) for use in the network of FIG. 1.

FIG. 2 illustrates an exemplary functional configuration for RBSs 18. As illustrated, an exemplary RBS 18-x comprises pooled transmitter circuits 30, forward link signal processing circuits 32, BSC interface circuits 34, pooled receiver circuits 36, and reverse link signal processing circuits 38 that include a Reverse Link (RL) Handoff (HO) control circuit 40. Control circuit 40 is associated with, or includes, a combining circuit, such as a maximum ratio combining circuit.

Figure 3:
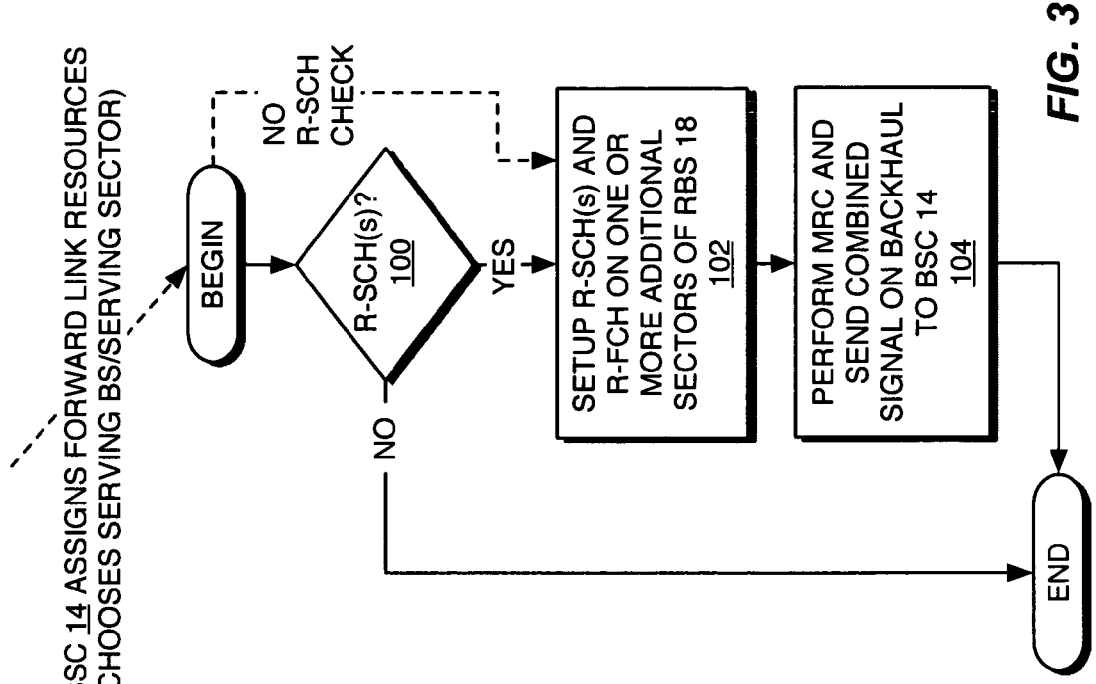
FIG. 3 is a diagram of exemplary processing logic associated with exemplary operations at the RBS of FIG. 2.

FIG. 3 illustrates associated exemplary processing logic that can be implemented in the illustrated RBS 18-x in hardware, in software, or in some combination of both. According to FIG. 3, processing begins with BSC 14 selecting a given sector of RBS 18-x as a serving sector for the mobile station 20. In response, RBS 18-x allocates forward and reverse link resources for the serving sector. By way of non-limiting example, FIG. 2 illustrates sector Si as the designated serving sector, and illustrates remaining sectors S2 and S3 as being used to make additional reverse link assignments to force the always-softer handoff condition on the mobile station's reverse link.

Thus, RBS 18-x allocates resources from the pooled transmitter circuits 30 and forward link signal processing circuits 32 for transmitting to the mobile station via the illustrated sector S1 transmit antenna. RBS 18-x further allocates resources from the pooled receiver circuits 36 and reverse link signal processing circuits 38 for receiving transmissions from the mobile station via the illustrated sector S1 receive antenna.

At this point, processing continues according to one of two embodiments. In a first embodiment the RBS 18-x forces an always-softer reverse link handoff condition for the mobile station 20 if the mobile station 20 has a R-SCH (Step 100). Thus, according to this embodiment, control circuit 40 of RBS 18-x proceeds with forcing the always-softer condition if mobile station 20 has a R-SCH or ends always-softer processing if it does not. In the second embodiment, the always-softer condition is forced irrespective of whether mobile station 20 has a R-SCH. Note that control circuit 40, which may be implemented in one or more microprocessor-based circuits executing stored program instructions, can be configured to implement such decision logic.

Making the always-softer reverse link condition dependent upon whether the mobile station 20 has a R-SCH may be desirable in the sense that R-SCHs typically are used for higher speed data transmission and thus represent relatively higher powered reverse link transmit channels. Thus, the ability to improve reverse link performance may take on added significance where such higher-powered channel signals are involved.

For example, by improving reverse link performance via the forced always-softer handoff condition, network 10 gains an opportunity to allow the mobile station 20 to transmit at a lower power without compromising its ability to receive reverse link transmissions from the mobile station 20. Thus, in an exemplary embodiment, mobile station 20 may be configured or commanded to reduce its reverse link transmit power to exploit the improved reverse link reception performance gained by the RBSs 18 forcing the always-softer reverse link handoff condition. Such command can be generated in the exemplary RBS 18-*x* as part of reverse link power control, or can be set based on signaling from BSC 14. For example, BSC 14 can send a reference value to mobile station 20 via RBS 18-*x* that sets a relative transmit gain for the mobile station's R-SCH to cause it to transmit the R-SCHs at a lower transmit gain.

Beyond that initial decision, processing for both embodiments continues along the same line of processing steps. In forcing the always-softer condition for the mobile station's reverse link, RBS 18-*x* sets up reverse links for the mobile station's R-FCH and R-SCHs (if used) at one or more additional sectors of RBS 18-*x* (Step 102). More specifically, RBS 18-*x* assigns one or more reverse links to the mobile station 20 from one or more of its "horizontal neighbor" sectors, wherein a "horizontal neighbor" sector denotes another sector at the same RBS that operates on the same carrier frequency used for the reverse link assignments made to the mobile station in the serving sector. It should be understood herein that additional sector assignments are made on the same frequency as the serving sector assignments whether or not the discussion explicitly refers to "horizontal neighbors."

Once the additional reverse link(s) is (are) set up for the mobile station 20, the combining circuit associated with control circuit 40 improves reverse link performance by combining reverse link signals received on all of the mobile station's assigned reverse links (Step 104). In so doing, the combining circuit can be configured to use maximum ratio combining wherein the multiple reverse link signals are additively combined to gain improved signal-to-noise ratio (SNR), or otherwise gain improved signal reception. Further, by involving one or more additional sector antennas in receiving the mobile station's reverse link transmissions, the likelihood that the mobile station's signal will be completely faded, i.e., momentarily blocked, is reduced. Such fading resistance arises because it is likely that at any given instant at least one of the RBSs sectorized receive antennas receives the mobile station's reverse link transmissions.

The benefits of always-softer handoff combining on the reverse link are well understood. Indeed, certain conventional wireless CDMA-based networks use softer combining on mobile stations' reverse links but only do so where a given RBS has two or more designated serving sectors. That is, the conventional approach uses softer handoff combining on the reverse link only when softer handoff is used on the mobile station's forward link.

Thus, the present invention markedly departs from the conventional approach by forcing the always-softer handoff condition at serving RBSs on the mobile station's reverse link irrespective whether the mobile station is in softer handoff at the RBS on the forward link. In this sense, then, the present invention can make use of existing handoff processing and softer handoff combining hardware and, indeed, can be economically implemented at exemplary RBSs 18-*x* simply by modifying selected hardware, selected software, or both, depending upon the particular RBS implementation involved.

Of course, those skilled in the art will appreciate that the foregoing details are not limiting and that the present invention can be varied in a number of ways. For example, each RBS 18-*x* can be configured to force the always-softer handoff reverse link handoff condition by allocating an extra reverse link from one of its remaining (non-serving) sectors, some of its remaining sectors, or all of its remaining sectors. Such allocation decisions can be fixed according to provisioning or other stored configuration data and need not be the same at all RBSs 18. Moreover, such allocation decisions can be made dynamically based on the availability of receiver resources, based on current reception conditions at the RBSs 18 or at a particular RBS 18-*x*, etc.

Regardless, the present invention broadly provides for the assignment of one or more reverse links at a mobile station's serving RBS (or RBSs) to force an always-softer reverse link handoff condition for the mobile station at that RBS or at those RBSs. Such softer handoff forcing can be predicated on the mobile station having a R-SCH, or can be done irrespective of the presence or absence of such channels. In any case, the exemplary RBS 18-*x* forces the always-softer condition by assigning one or more reverse links from non-serving sectors irrespective of whether those sectors are suitable for serving the mobile station in the forward link, i.e., irrespective of whether such sectors are identified in the mobile station's active set.

As such, the present invention is not limited by the foregoing exemplary details. Rather, the present invention is limited only by the following claims and their reasonable equivalents.

What is claimed is:

1. A method of improving reverse link communications at a Radio Base Station (RBS) providing a plurality of radio sectors, the method comprising:
   forcing always-softer reverse link handoff conditions at the RBS for mobile stations served by the RBS based on assigning one or more additional reverse links from non-serving sectors of the RBS if a reverse link is assigned to a mobile station from a serving sector of the RBS; and
   combining reverse link signals from the assigned reverse links to obtain a combined reverse link signal for the mobile station.

2. The method of claim 1, wherein combining reverse link signals from the assigned reverse links to obtain a combined reverse link signal for the mobile station comprises performing maximum ratio combining of the reverse link signals.

3. The method of claim 1, further comprising assigning the one or more additional reverse links irrespective of whether the corresponding sectors are suitable for forward link assignments to the mobile station.

4. The method of claim 1, wherein forcing always-softer reverse link handoff conditions at the RBS for mobile stations served by the RBS based on assigning one or more additional reverse links from non-serving of the RBS if a reverse link is assigned to a mobile station from a serving sector of the RBS comprises:
   determining whether any reverse link supplemental channel (R-SCH) is assigned to the mobile station; and
   forcing the always-softer reverse link handoff condition if a R-SCH is assigned to the mobile station and not forcing the always-softer reverse link handoff condition if no R-SCH is assigned to the mobile station.

5. The method of claim 4, further comprising forcing the always-softer reverse link handoff condition at the RBS for any reverse link fundamental channel (R-FCH) assigned to the mobile station in conjunction with forcing the always-softer reverse link handoff condition at the RBS for any R-SCH assigned to the mobile station.

6. The method of claim 1, further comprising causing the mobile station to reduce a reverse link transmit power in conjunction with implementing the always-softer handoff to account for improved reception quality of the combined reverse link signal.

7. The method of claim 6, wherein causing the mobile station to reduce a reverse link transmit power in conjunction with implementing the always-softer reverse link handoff comprises causing the mobile station to reduce a transmit gain of a reverse link supplemental channel signal transmitted by the mobile station to the RBS on the assigned reverse links.

8. The method of claim 1, further comprising increasing a finger search window used by RAKE receiver radio circuits at the RBS in conjunction with forcing the always-softer reverse link handoff condition at the RBS.

9. A Radio Base Station (RBS) having a plurality of radio sectors, the RBS comprising:
   a handoff control circuit configured to implement always-softer reverse link handoff at the RBS by assigning one or more additional reverse links from non-serving sectors of the RBS if a reverse link is assigned to a mobile station from a serving sector of the RBS; and
   a combining circuit to combine reverse link signals from the assigned reverse links to obtain a combined reverse link signal for the mobile station.

10. The RBS of claim 9, wherein the combining circuit employs maximum ratio combining to combine the reverse link signals from the assigned reverse links.

11. The RBS of claim 9, wherein the handoff control circuit is configured to assign the one or more additional reverse links irrespective of whether the corresponding sectors are suitable for forward link assignments to the mobile station.

12. The RBS of claim 9, wherein the handoff control circuit is configured to implement always-softer reverse link handoff based on determining whether any reverse link supplemental channel (R-SCH) is assigned to the mobile station, implement the always-softer reverse link handoff if a R-SCH is assigned to the mobile station, and not implement the always-softer reverse link handoff if no R-SCH is assigned to the mobile station.

13. The RBS of claim 12, wherein the handoff control circuit is configured to implement the always-softer reverse link handoff at the RBS for any reverse link fundamental channel (R-FCH) assigned to the mobile station in conjunction with implementing the always-softer reverse link handoff at the RBS for any R-SCH assigned to the mobile station.

14. The RBS of claim 9, wherein the RBS is configured to use an increased finger search window for one or more RAKE receiver radio circuits used at the RBS for receiving the reverse link signals from the mobile station in conjunction with forcing the always-softer reverse link handoff condition for the mobile station.

15. A method of improving reverse link communications at a Radio Base Station (RBS) having a plurality of radio sectors, the method comprising:
   selecting a first sector of the RBS as a serving sector for a mobile station and assigning forward and reverse links to the mobile station at the serving sector;
   selectively forcing an always-softer reverse link handoff condition for the mobile station at the RBS by assigning one or more additional reverse links to the mobile station at one or more remaining sectors of the RBS; and
   combining the reverse link signals from the mobile station from the assigned reverse links to form a combined reverse link signal.

16. The method of claim 15, further comprising transmitting the combined reverse link signal over a backhaul link to a supporting Base Station Controller (BSC).

17. The method of claim 15, further comprising making forward link assignments independently of assigning the one or more additional reverse links to the mobile station.

18. The method of claim 15, wherein selectively forcing an always-softer reverse link handoff condition for the mobile station at the RBS by assigning one or more additional reverse links to the mobile station at one or more non-serving sectors of the RBS comprises:
   implementing always-softer reverse link handoff for the mobile station if any reverse link supplemental channels (R-SCHs) are being used for the mobile station; and
   not implementing always-softer reverse link handoff for the mobile station if no R-SCHs are being used for the mobile station.

19. The method of claim 18, further comprising if the always-softer reverse link handoff condition is forced for any R-SCHs associated with the mobile station, then forcing the always-softer reverse link handoff condition for any reverse link fundamental channel (R-FCH) associated with the mobile station.

20. The method of claim 15, further comprising causing the mobile station to reduce a reverse link transmit power if the always-softer reverse link handoff condition is forced for the mobile station.

21. The method of claim 20, wherein causing the mobile station to reduce a reverse link transmit power if the always-softer reverse link handoff condition is forced for the mobile station comprises causing the mobile station to reduce a transmit gain of a reverse link supplemental channel signal transmitted by the mobile station to the RBS on the assigned reverse links.

22. The method of claim 15, further comprising increasing a finger search window used by RAKE receiver radio circuits at the RBS for receiving reverse link signals from the mobile station to account for potentially greater reverse link signal dispersion at the RBS arising from forcing the always-softer reverse link handoff condition.

* * * * *